US008717862B2

(12) United States Patent
Xu (10) Patent No.: US 8,717,862 B2
(45) Date of Patent: May 6, 2014

(54) COMMUNICATION APPARATUS AND METHOD

(75) Inventor: Wen Xu, Neubiberg (DE)

(73) Assignee: Lantiq Deutschland GmbH, Neubiberg (DE)

(*) Notice: Subject to any disclaimer, the term of this patent is extended or adjusted under 35 U.S.C. 154(b) by 816 days.

(21) Appl. No.: 12/348,598

(22) Filed: Jan. 5, 2009

(65) Prior Publication Data
US 2009/0175156 A1 Jul. 9, 2009

Related U.S. Application Data

(60) Provisional application No. 61/019,493, filed on Jan. 7, 2008.

(51) Int. Cl.
*H04J 1/12* (2006.01)

(52) U.S. Cl.
USPC .......................................... 370/201; 370/203

(58) Field of Classification Search
USPC ................................................. 370/201, 203
See application file for complete search history.

(56) References Cited

U.S. PATENT DOCUMENTS

| 4,281,409 A * | 7/1981 | Schneider ..................... 370/201 |
| 6,990,196 B2 * | 1/2006 | Zeng et al. ..................... 379/417 |
| 2002/0008525 A1 * | 1/2002 | Seagraves et al. ............ 324/500 |
| 2006/0034162 A1 * | 2/2006 | Jones et al. ..................... 370/201 |
| 2007/0002722 A1 * | 1/2007 | Palaskas et al. ............... 370/201 |
| 2008/0159448 A1 * | 7/2008 | Anim-Appiah et al. ....... 375/346 |
| 2009/0059780 A1 * | 3/2009 | De Lind Van Wijngaarden et al. ............................. 370/201 |

OTHER PUBLICATIONS

Cendrillon, R., et al., "The Linear Zero-Forcing Crosstalk Canceler is Near-optimal in DSL Channels," IEEE Global Telecommunications Conference, 2004, vol. 4, Nov. 29-Dec. 3, 2004, 5 pages, IEEE.
"G. Ploam, G. Adsl, G. Vdsl—Overview of technologies for vectored DSL," ITU-Telecommunication Standardization Sector, Temporary Document GB-058R1, Study Group 15, Jun. 12-16, 2006, pp. 1-8, ASSIA Inc.
"G. vdsl: Using orthogonal pilot sequences for assisting FEXT channel estimation in vector transmission," ITU-Telecommunication Standardization Sector, Temporary Document SD-036, Study Group 15, Jan. 15-19, 2007, 4 pages, Upzide Labs AB and ASSIA Inc.
"G. vdsl: Using Error Samples for Downstream Self-FEXT Cancellation Pre-Coding in VDSL2," ITU-Telecommunication Standardization Sector, Temporary Document SD-052, Study Group 15, Jan. 15-19, 2007, pp. 1-7, Conexant Systems, Inc.
"G. vdsl: Implementation of the "Abuse of Receivers" method for FEXT Cancellation," ITU-Telecommunication Standardization Sector, Temporary Document SD-064, Study Group 15, Jan. 15-19, 2007, pp. 1-7, Acetelis Networks.
"Second Letter Ballot Draft of the DSM Technical Report," NIPP-NAI-2007-013R4, Feb. 12-15, 2007, 96 pages, NIPP-NAI, Editor DSM Technical Report.

(Continued)

*Primary Examiner* — Omer S Mian
(74) *Attorney, Agent, or Firm* — Slater & Matsil, L.L.P.

(57) ABSTRACT

In accordance with an embodiment, a method for determining coupling coefficients between at least two communication links includes providing a respective pilot signal for at least one of the at least two communication links, adding a respective test signal to the respective pilot signal of at least one first link of the at least two communication links to form respective combined signals, and transmitting the respective combined signal.

31 Claims, 2 Drawing Sheets

(56) References Cited

OTHER PUBLICATIONS

"G.vdsl: Crosstalk channel estimation with improved convergence," ITU-Telecommunication Standardization Sector, Temporary Document NC-082, Study Group 15, Apr. 16-20, 2007, pp. 1-7, Ikanos Communications.

"G. vector: Proposal for downstream FEXT cancellation method," ITU-Telecommunication Standardization Sector, Temporary Document RJ-036, Study Group 15, Oct. 8-12, 2007, 8 pages, Infineon Technologies.

"G. vector: New crosstalk channel estimation method, to be used as benchmark a minimal reference for performance requirements," ITU-Telecommunication Standardization Sector, Temporary Document RJ-060, Study Group 15, Oct. 8-12, 2007, pp. 1-22, Alcatel-Lucent.

* cited by examiner

COMMUNICATION APPARATUS AND METHOD

This application claims the benefit of U.S. Provisional Application No. 61/019,493, filed on Jan. 7, 2008, entitled "Communication Apparatus and Method," which application is hereby incorporated herein by reference.

TECHNICAL FIELD

The present invention related generally to a communication apparatus and method.

BACKGROUND

In multiuser communication systems, crosstalk is a phenomenon having a negative impact of the capability of a system, for example, on a data rate, transmission quality and the like. One type of crosstalk is so-called far end crosstalk which occurs between communication lines influencing each other, for example, between a plurality of physical wired lines from a central office to different customers or in wireless communication systems.

An approach to reduce crosstalk is the so-called vectoring, which involves a joined processing of a plurality of communication lines at a transmitter and/or a receiver depending on crosstalk reduction parameters. In some cases, depending on the computational power only a group of communication lines (so-called vectored group) selected from all communication lines used is subjected to the vectoring (so-called partial vectoring). In this case, lines may be added to the group or removed from the group.

For determining the above-mentioned crosstalk reduction parameters, information describing the crosstalk between the relevant communication lines, for example, coupling coefficients describing a coupling strength between the communication lines, is required.

For this and other reasons, there is a need for efficient methods and apparatuses to determine information describing the crosstalk coupling between a plurality, i.e., at least two, communication lines.

SUMMARY OF THE INVENTION

In an exemplary embodiment, a method for determining coupling coefficients between at least two communication lines, the method comprising:

providing a respective pilot signal for at least one of the at least two communication lines, adding a respective test symbol to the respective pilot signals of at least one first link of the at least two communication links to form a respective combined signal, transmitting the respective combined signal.

In other embodiments, other methods and also communication apparatuses are provided.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In the following, exemplary embodiments of the present invention will be described in detail. It is to be understood that the following description is given only for the purpose of illustration and is not to be taken in a limiting sense. The scope of the invention is not intended to be limited by the exemplary embodiments shown in the drawings and described hereinafter.

It is also to be understood that in the following description of exemplary embodiments any direct connection or coupling between functional blocks, devices, components, circuit elements or other physical or functional units shown in the drawings or described herein could also be implemented by an indirect connection or coupling, i.e., a connection comprising additional intervening elements. Furthermore, connections shown may be implemented both by wire-based connections and by wireless connections in various embodiments. Furthermore, it should be appreciated that functional blocks or units shown in the drawings may be implemented as separate circuits in embodiments, but may also be fully or partially implemented in a common circuit in other embodiments.

It is to be understood that the features of the various exemplary embodiments described herein may be combined with each other unless specifically noted otherwise.

Figure 1:
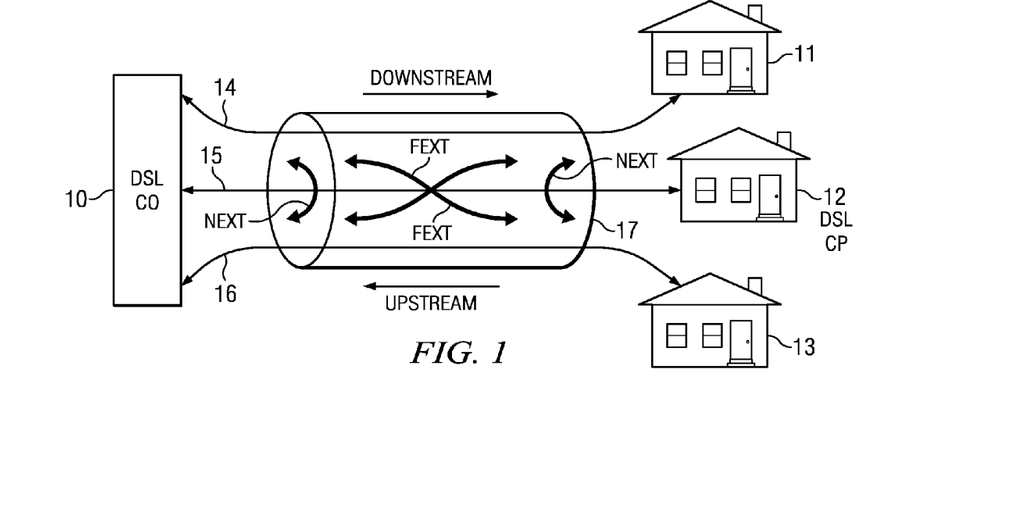
FIG. 1 shows a schematic diagram of a communication system according to an embodiment of the present invention.

In the following, embodiments of communication apparatuses and corresponding methods will be discussed. FIG. 1 shows a communication system according to an embodiment of the present invention.

The communication system according to the embodiment of FIG. 1 comprises a communication apparatus 10 communicating with a plurality of communication apparatuses 11, 12, 13 via a corresponding plurality of communication lines 14, 15 and 16. In an embodiment, communication apparatus 10 is a so-called central office equipment, i.e., is generally within the responsibility of a provider of communication services, while communication apparatuses 11, 12 and 13 are located in customer's premises (CP), for example, at sites of clients of the above-mentioned service provider.

It should be noted that while three communication apparatuses 11, 12, 13 are shown in the embodiment of FIG. 1, these communication apparatuses are to be understood as representing any arbitrary number of communication apparatuses with which the communication apparatus 10 communicates.

In the embodiment of FIG. 1, communication lines 14, 15 and 16 are bidirectional lines. In another embodiment, communication lines 14, 15 and 16 may be unidirectional lines.

Communication lines 14, 15 and 16 in the embodiment of FIG. 1 are wire-based communication lines, for example, twisted copper pairs as used for DSL (digital subscriber line) communication, for example ADSL or VDSL communication. In another embodiment, communication lines 14, 15 and 16 represent wireless communication lines.

The communication direction from communication apparatus 10 to communication apparatuses 11-13 will be designated downstream direction and the communication direction from communication apparatuses 11-13 to communication apparatus 10 will be designated upstream direction in the following.

As indicated by arrows, crosstalk may occur between two or more of the communication lines 14, 15, 16, i.e., signals in one communication line may influence signals in another communication line in particular so-called far-end crosstalk (FEXT) and so-called near-end crosstalk (NEXT). In case of wire-based communication, such crosstalk is more likely to occur between communication lines in a so-called binder 17 symbolized by a cylinder surrounding the communication lines in FIG. 1. In a binder, communication lines are close together, enhancing crosstalk. On the other hand, crosstalk may also occur between communication lines in different binders or between wireless communication lines.

Crosstalk as indicated by arrows in FIG. 1 may occur both in upstream direction and in downstream direction.

In an embodiment, communication apparatus 10 comprises crosstalk reduction mechanisms for partially or fully compensating the effects of crosstalks for some or all of the communication lines 14-16. While in an embodiment this crosstalk reduction is aimed at reducing crosstalk in all communication lines, in other embodiments crosstalk reduction is performed only for some of the communication lines. The selection which lines are used for crosstalk reduction may be made based on the strength of crosstalk in the respective lines and the corresponding deterioration of communication capabilities, for example, bit rate, but may additionally or alternatively also be made depending on other factors, for example, a contract of a respective client which is connected with a central office via communication lines, like service standards in such a contract.

In an embodiment, the communication lines to which crosstalk reduction is applied may change over time. For example, when a communication line becomes inactive, it may be removed from the group of lines subjected crosstalk reduction, if crosstalk influence in lines change, lines in the groups may be exchanged with lines outside the group, etc. In an embodiment, the respective crosstalk reduction mechanisms in communication apparatus 10 are adapted accordingly.

Assume that the coordinated group has N users which are also called here the vectored or cooperative users (lines). Let $X_n^k, Y_n^k$, and $Z_n^k$ denote the transmitted (pilots or data) symbol, the received symbol, and the (background) noise of the n-th user on a given tone k, respectively. For simplicity of notation, the dependence on frequency (tone) may not be explicitly shown when there is no confusion, i.e., $X_n = X_n^k$, $Y_n = Y_n^k, Z_n = Z_n^k$. In the following embodiments of communication apparatuses will be discussed in greater detail. In the description of these embodiments, a system model will be used for describing crosstalk and crosstalk cancellation which will be explained first.

According to this model, communication over a channel may be described by:

$$Y_n = H_{n,n} X_n + \sum_{n \neq m} H_{n,m} X_m + Z_n \qquad (1)$$

In equation (1), n is an index denoting a line. $Y_n$ denotes a received symbol, $X_n$ denotes a transmitted symbol, and $Z_n$ denotes noise. For example, applied to the embodiment of FIG. 1 in downstream direction $Y_n$ denotes a symbol received by one of communication apparatuses 11, 12 and 13 (identified by n), $X_n$ denotes the corresponding symbol sent by communication apparatus 10, and $Z_n$ denotes the noise of the corresponding communication line 14, 15, 16. In upstream direction, $X_n$ correspondingly denotes any symbol sent by the communication apparatus 11, 12, 13 identified by n, $Y_n$ denotes the corresponding symbol received by communication apparatus 10, and $Z_n$ again denotes the noise on the respective communication line. In other embodiments, other types of data units than symbols may be used.

$H_{n,m}$ is a complex valued interference coupling factor describing the interference or crosstalk from channel m to channel n. Therefore, the second term on the right side of equation (1) represents the crosstalk or inter-user interference experienced by channel n from all the other channels m. Such a type of crosstalk is also known as far end crosstalk (FEXT).

In case of DSL systems, a channel may, for example, correspond to a metallic line $H_{n,m}$ may represent, for example, a cascade of inverse discrete Fourier transformation, digital to analog converter, transmit filter of channel m, the actual physical line and the receive filter, analog to digital converter and discrete Fourier transformation of line n. In communication systems other than DSL systems, $H_{n,m}$ may represent, for example, modulation/demodulation circuits and the transmission channel of the respective users.

In case of DSL transmission, crosstalk occurs, for example, between metallic twisted pair lines in a binder, in which case $H_{n,m}$ represents the coupling coefficient for crosstalk from line m into line n.

In an embodiment, multi frequency transmission techniques may be used for data transmission, i.e., data may be transmitted via a line for a user of the communication channel in a plurality of frequency ranges. An example for such a multi-frequency transmission techniques is discrete multi-tone modulation (DMT) which is, for example, used in some DSL transmission systems, the frequency ranges in DMT also being referred to as tones. In such an embodiment, in a case where no or only negligible cross-talk exists between different frequency ranges in different lines, equation (1) may be applied to each frequency range or tone separately. In an embodiment where crosstalk between different frequency ranges or tone should also be taken into account, each line n in equation (1) has a specific frequency range. For example, in case of two users each using 100 different frequency ranges, k=0 . . . 99 may denote frequency ranges 0-99 of the first user, k=100 . . . 199 may denote frequency ranges 0-99 for the second user, and n=200 . . . 299 may denote frequency ranges 0-99 of the third user. Since, as can be seen from this example, equation (1) may easily be used both for the case of single frequency transmission techniques as well for multi frequency transmission techniques, and the same holds true for the explanations and embodiments which will follow, for simplicity's sake and to provide an easier understanding of the embodiments which will be described in the following, n will be assumed to denote a user using a channel, link or line in the following, i.e. channel, user, line and link will be used in an interchangeable manner in the following. As explained above, the same equations may be used for the case where more than one channel, e.g., more than one frequency range, is assigned to a user.

As already mentioned, in embodiments a crosstalk reduction or cancellation is performed for some or all of the users of a communication system. The users for which crosstalk cancellation is performed will also be denoted vectored or corporative group in the following. At least initially, this group is assumed to have N users. Using $$x = [X_0 X_1 \ldots X_{N-1}]^T \qquad (2)$$

$$y = [Y_0 Y_1 \ldots Y_{N-1}]^T \qquad (3)$$

$$z = [Z_0 Z_1 \ldots Z_{N-1}]^T \qquad (4)$$

wherein $(.)^T$ denotes transpose, and $$H = \begin{bmatrix} H_{0,0} & H_{0,1} & \cdots & H_{0,N-1} \\ H_{1,0} & H_{1,1} & \cdots & H_{1,N-1} \\ \vdots & \vdots & \ddots & \vdots \\ H_{N-1,0} & H_{N-1,1} & \cdots & H_{N-1,N-1} \end{bmatrix} \quad (5)$$

equation (1) may, for all n, expressed in a vector form as $$y = Hx + z \quad (6)$$

Figure 2:
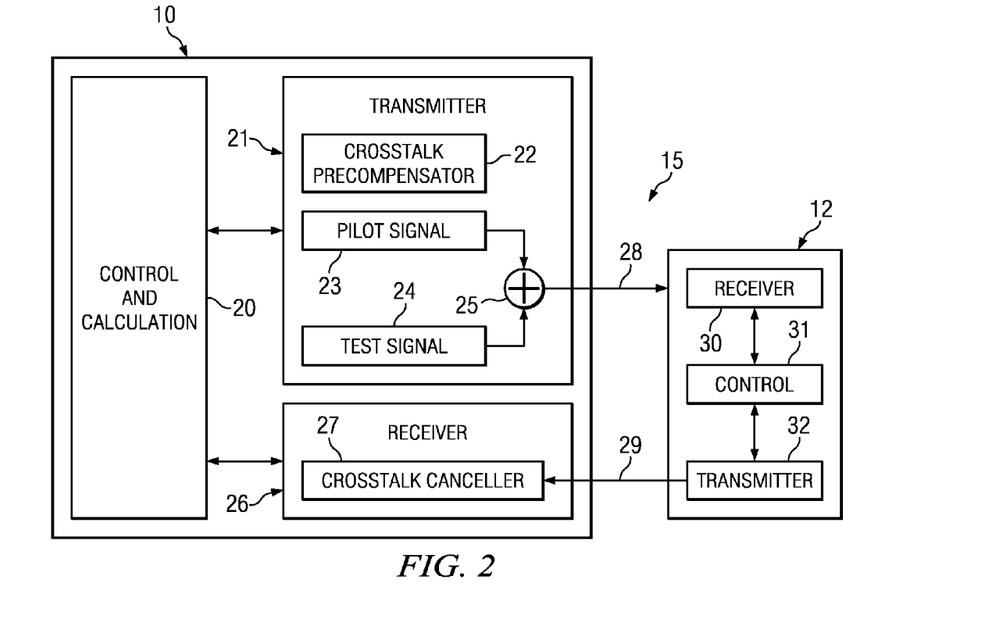
FIG. 2 shows a block diagram of a portion of the communication system of FIG. 1 according to an embodiment.

In FIG. 2, a portion of the embodiment of FIG. 1 using crosstalk reduction is shown in more detail.

As shown in FIG. 2, communication apparatus 10 comprises a control and calculation circuit 20 controlling a transmitter 21 and a receiver 26. Transmitter 21 serves to transmit data via a plurality of lines coupled to communication apparatus 10, for example lines 14, 15 and 16 of FIG. 1. For clarity's sake, only one of these lines is shown in FIG. 1, namely line 15. In the embodiment shown in FIG. 2, line 15 is bidirectional line, wherein a downstream channel 28 and an upstream channel 29 are depicted separately in FIG. 2. Downstream channel 28 and upstream channel 29 may use the same physical wired line, but may also use independent lines or independent other kind of communication links, for example, wireless links.

Furthermore, in FIG. 2, communication apparatus 12 is shown as comprising a receiver 30, a transmitter 32 for transmitting data to communication apparatus 10 via the upstream channel 29 and a control circuit 31 controlling receiver 30 and transmitter 32. Data transmitted by transmitter 32 is received in communication apparatus 10 via receiver 26.

In the embodiment of FIG. 2, data sent via a plurality of communication lines is processed jointly in crosstalk precompensator 22 in order to provide crosstalk reduction. Likewise, in receiver 26, data received via the plurality of communication channels is processed jointly by crosstalk canceller 27 to reduce crosstalk in the signal received.

Embodiments of crosstalk precompensator 22 and crosstalk canceller 27 will be discussed next. To explain the function of crosstalk precompensator 22, it is assumed that on each of the lines, a symbol is transmitted, wherein on the first line of altogether N lines, a symbol $U_0$ is transmitted, on the second line a symbol $U_1$ is transmitted etc., and on the N-th line, a symbol $U_{N-1}$ is transmitted. These symbols for the plurality of lines n may be written as a vector u according to $$u = [U_0\ U_1 \ldots U_{N-1}]^T \quad (7)$$

Vector u, i.e. the information symbols of the users 0, ..., N−1 of the vectored group, are in an embodiment processed by precompensation circuit 22 which calculates a vector x of the transmitted symbols, x being defined as in equation (2), based on u. In an embodiment, precompensation unit 21 is a linear precompensator where the transmitted symbol $X_n$ of the n-th user is a linear combination of the information symbols u of all the users, i.e.

$$x = Pu \quad (8)$$

wherein P denotes a N-by-N precompensation matrix.

However, in another embodiment a non-linear precompensation circuit 22 may be used as well wherein x is determined based on u in a non-linear manner.

In an embodiment, precompensation matrix P may be written as $$p = H^{-1}H_d = (H_d^{-1}H)^{-1} \quad (9)$$

(so-called zero-forcing equalizer) wherein $H^{-1}$ denotes the inverse matrix of H, $H_d := \{H\}_d$ denotes the operator on H such that $\{H\}_d$ contains only the diagonal entries of H, i.e., $$\{.\}_d = \begin{bmatrix} H_{0,0} & & & \\ & H_{1,1} & & \\ & & \ddots & \\ & & & H_{N-1,N-1} \end{bmatrix} \quad (10)$$

Let {.} denote an operator selecting only the non-diagonal entries of its argument, i.e.

$$\{.\} = \begin{bmatrix} 0 & H_{0,1} & \cdots & H_{0,N-1} \\ H_{1,0} & H_{1,1} & \cdots & H_{1,N-1} \\ \vdots & \vdots & \ddots & \vdots \\ H_{N-1,0} & H_{N-1,1} & \cdots & 0 \end{bmatrix} \quad (11)$$

The matrix H of equation (5) can be written as $$H = H_d + H_{nd} \quad (12)$$

The symbols X such obtained are then transmitted via the communication lines using transmitter 21, which may, for example, comprise inverse fast Fourier transformation circuits, output amplifiers and the like to generate transmission signals s transmitted via the communication channels. As already indicated, in the system model used for describing the system the effect of transmitter 21 are comprised in the matrix H, for example, in the diagonal elements thereof.

Combining equations (6), (8) and (9), at the receiver symbols y are received according to $$y = Hx + z = H_d u + z \quad (13)$$

or equivalently $$Y_n = H_{n,n} U_n + Z_n \quad (14)$$

As can be seen from equations (13) and (14), in an embodiment which uses a precompensation matrix as defined by equation (9), the receive signals does not comprise far end crosstalk, i.e., crosstalk generated by transmission in various lines in the same direction, as described by equation (1). It should be noted that other types of crosstalk like so called near end crosstalk may still be present, and/or additional measures may be taken against such types of crosstalk in embodiments.

Notice that $H_d^{-1}H$ denotes in fact an equivalent channel for which the transfer function of the direct signal path is normalized to $H_{n,n} = 1$. The normalization of the direct channel is usually accomplished at receiver by the frequency domain equalizer (FEQ) whose direct signal path transfer function is $H_d^{-1}$. In the following, we may sometimes for simplicity use the term diagonally normalized channel to denote an equivalent channel whose direct signal path is normalized to 1. For the DSL MIMO system, the diagonally normalized channel is the equivalent channel containing the FEQ in it. In general, for a diagonally normalized channel H, it holds $H_d = I$, and its ZF pre-compensator can be written as $$P = H^{-1} \quad (15)$$

The communication apparatus according to the embodiment of FIG. 2 furthermore comprises control and calculation circuit 20 which determines and modifies precompensation matrix P. At start up of the system, precompensation matrix P in an embodiment is calculated according to equation (9). In an embodiment, to this end matrix H is determined, for example, by transmitting and analyzing test sequences or other known data like pilot symbols over the various communication lines (so-called channel estimation). Embodiments of this will be described later.

During operation, using for example so called channel tracking matrix P is adjusted to changes in the properties of the communication lines, in particular to changes of the crosstalk therebetween, e.g., by using so-called channel tracking.

Furthermore, control and calculation unit 20 adapts precompensation matrix P in case users join or leave the vectored group or users in the vectored group are exchanged as mentioned above.

It should be noted that matrix H may be the same for upstream and downstream direction, but in other embodiments also separate matrixes H may be used to describe crosstalk for the two transmission directions separately.

The embodiment of FIG. 2 uses a precompensation circuit 22 which modifies data to be transmitted via two transmissions for reducing the effects of crosstalk.

Furthermore, in the embodiment of FIG. 2 receiver 26 which may comprise elements like receive filters, amplifiers, fast Fourier transformation circuits and the like receivers received symbols $Y_n$ which according to equation (3) may be written in a vector y. The effects of these elements in the system model used for describing the communication system are incorporated in matrix H. The symbols y in the embodiment of FIG. 2 are processed by a crosstalk cancellation circuit 27. Crosstalk cancellation circuit 27 calculates information symbols $X_n$ for each user n in the vectored group.

For the upstream direction, the co-location of the receivers allows joint signal processing or coordinated/cooperative receiving, especially the receiver interference cancellation. When the channel matrix H is known (e.g., through channel estimation), the transmitted symbol can be determined with an equalization algorithm. The (crosstalk) interference cancellers can be linear or nonlinear. The simplest linear equalizer is the so-called zero forcing (ZF) linear equalizer, which simply inverts the channel impulse response so that the channel exhibits no interference. The ZF equalizer minimizes the peak distortion (interference). Its transfer function, i.e., the interference canceller (matrix), can be written as $$C = H_d H^{-1} = (HH_d^{-1})^{-1} \quad (16)$$

with $H_d^{-1}$ being the FEQ transfer function. For the diagonally normalized MIMO channel (e.g. containing the FEQ in the channel), it holds $H_d = I$, then the ZF canceller becomes $$C = H^{-1} \quad (17)$$

This calculation may be performed by a control and calculation circuit 20 in the embodiment of FIG. 2, wherein control and calculation circuit for example at the initialization of the communication determines H, for example using channel estimation. In this case, combining equations (2), (15) and (16) yields the estimated data symbol of $\hat{x}$.

$$\hat{x} = Cy = x + H^{-1}z \quad (18)$$

As can be seen, in this case the effects of crosstalk described by matrix H are basically completely eliminated, and noise z is modified becoming $H^{-1}z$. Depending on the channel matrix H, this may lead to enhancement of noise.

The crosstalk cancellation matrix of equation (16) corresponds to a so called zero forcing linear equalizer, similar to the precompensation matrix defined in equation (9). In other embodiments, other types of equalizers, both linear equalizers and non-linear equalizers, may be used, for example, DFE (decision feedback equalizers) or MMSE (minimum mean square error) equalizers. For example, the minimum mean square error equalizer minimized the mean square difference between the channel input and output of the crosstalk cancellation unit 31 to achieve a compromise between cancellation of crosstalk and noise enhancement.

For practical DSL applications, the FEXT channel matrix H is usually columnwise and/or rowwise diagonally dominant; i.e., within a column or within a row, the magnitudes of the diagonal elements are much larger than those of the off-diagonal elements. Due to the diagonal dominance property, the inversion of the FEXT channel matrix $H^{-1}$ can be replaced by its first-order approximation, $$H^{-1} = (H_d(I + H_d^{-1} H_{nd}))^{-1} \quad (19)$$
$$\approx (I - H_d^{-1} H_{nd}) H_d^{-1}$$

Then, the interference canceller, e.g. pre-compensator P, can be written as $$P = H^{-1} H_d \approx I - H_d^{-1} H_{nd} \quad (20)$$

Since there is no matrix inversion or matrix multiplication in the calculation of the approximated C and P, the computational complexity can be significantly reduced. It is easy to see that the first order approximation FEXT cancellation cannot completely cancel all FEXT. For example, in the case of pre-compensation, the received signal is given by $$y = HPu + z = (H_d + H_{nd})(I - H_d^{-1} H_{nd})u + z =$$
$$(H_d - H_{nd} H_d^{-1} H_{nd})u + z \quad (21)$$

which contains, as expected, residual FEXT $H_{nd} H_d^{-1} H_{nd} u$. In fact, for 12 twisted pairs in a binder, typical performance gain in terms of data rate using the first order approximation ZF FEXT cancellation is only about half of the gain using the optimal ZF cancellation. Therefore, the approximated ZF pre-compensator achieves a trade-off between performance and computational complexity. When the first order approximation of $H^{-1}$ is not good enough, the second as well as the third order approximation needs to be considered. This, however, will lead to higher computational complexity.

The ZF interference cancellation described above assumes full knowledge of the channel. In reality, the channel matrix is not known and therefore needs to be estimated. Adaptive interference cancellation algorithms provide means to directly cancel the interferences. It in general does not require an explicit inversion of the channel matrix. Among the adaptive algorithms the Least Mean Squares (LMS) Algorithm is due to its simplicity widely used in practice. The LMS algorithm is basically a steepest descent algorithm minimizing a given cost function. The convergence speed of the LMS algorithm highly depends on the step size which needs to be carefully chosen to guarantee stable behavior of the LMS and relatively fast convergence.

In another embodiment, a second or higher order approximation may be used.

Next, embodiments for channel estimation, i.e., basically for determining Matrix H will be described.

First, a mathematical description used for explaining such embodiments will be discussed. Consider the general system model used above which is valid for both upstream (US) and downstream (DS) crosstalk cancellation. Let us assume L (N×1)-transmit vectors $x_0, x_1, \ldots, x_{L-1}$ and receive vectors $y_0, y_1, \ldots, y_{L-1}$ are employed for channel estimation, i.e., $$y_l = Hx_l + z_l \; \forall l = 0, 1, \ldots, L-1 \quad (22)$$

Then, we have $$Y = HX + Z \quad (23)$$

where $X:=[x_0, x_1, \ldots, x_{L-1}]$, $Y:=[y_0, y_1, \ldots, y_{L-1}]$ and $Z:=[z_0, z_1, \ldots, z_{L-1}]$ are N×L matrices which are built by stacking L transmit, receive and noise vectors, respectively.

Consequently, the channel matrix can be solved as $$H=(Y-Z)X^+ \quad (24)$$

where $X^+$ is the Moore-Penrose pseudo-inverse. To determine H which has full rank of N, $X^+$ must uniquely exist, or equivalently X must have full row rank N such that $XX^*$ is invertible. In this case, $$X^+=X^*(XX^*)^{-1} \quad (25)$$

$(.)^*$ denotes the conjugate transpose of a matrix.

In case that X and Y are known, the least square (LS) estimate of H can be computed as $$\hat{H}=YX^+ \quad (26)$$

In case Z is the zero-mean additive white Gaussian noise with a variance $\sigma_Z^2$, the LS estimate is also the optimal maximum likelihood (ML) estimate. In this case, the channel estimation error is equal to $$H-\hat{H}=ZX^+ \quad (27)$$

In an embodiment of a DSL system, the so-called normalized slicer error is widely used, and has also been proposed as the feedback information for the downstream crosstalk cancellation. The slicer error is computed for known $x_l$ and $y_l$ as $$e_l=H_d^{-1}y_l-x_l \quad (28)$$

or equivalently $$E=H_d^{-1}Y-X \quad (29)$$

where $E:=[e_0, e_1, \ldots, e_{L-1}]$ is an N×L matrix built by stacking L slicer error vectors and the channel coupling coefficients of direct signals, $H_d$, can determined by the frequency domain equalizer (FEQ) in advance. Since $e_l$ and $y_l$ have a one-to-one relationship with each other. $y_l$ can be computed when $e_l$ is known and vice versa. For this reason, $e_l$ is also as receive signal here. The following discussion may mainly concentrate on $y_l$, but it is valid for $e_l$ as well.

In case that we have now the slicer error instead of the receive signal available, then we have $$E=H_d^{-1}((H_d+H_{nd})X+Z)-X=H_dH^{-1}H_{nd}X+H_d^{-1}Z \quad (30)$$

$$H_{nd}=(H_dE-Z)X^+ \quad (31)$$

The least square estimate of $H_{nd}$ can be computed as $$\hat{H}_{nd}=(H_dE)X^+ \quad (32)$$

The channel estimation error is given as $$H_{nd}-\hat{H}_{nd}=ZX^+ \quad (33)$$

Notice that the existence of $X^+=X^*(XX^*)^{-1}$ is necessary for determining the channel H or $H_{nd}$ in the above-described way. To ensure the existence of $(XX^*)^{-1}$, transmit signal $X:=[x_0, x_1, \ldots, x_{L-1}]$ has to be properly chosen. Briefly, the necessary and sufficient condition for the existence of $(XX^*)^{-1}$ is that all N row vectors of X are linearly independent of each other, or equivalently, there is at least one set of N column vectors (out of L column vectors $x_0, x_1, \ldots, x_{L-1}$) which are linearly independent of each other.

From the above analysis, it is clear that $L \geq N$ must hold to allow H or $H_{nd}$ be determined. In the embodiment of L=N, transmit signal X and the corresponding error signal $H_dE$ (or receive signal Y) are adequate for the channel to be estimated, once the N vectors $x_0, x_1, \ldots, x_{N-1}$ are linearly independent.

When regular data is chosen as the training signal X, the independency of all N row vectors of X is usually ensured due to the statistical independency of the regular data, as long as enough data (i.e. L is large enough) and the corresponding error signal $H_dE$ (or receive signal Y) are collected. In many DSL systems, statistical independency of the regular transmit data is guaranteed since pseudo-random scrambler is employed to randomize the transmit data.

To avoid high complexity in computing $(XX^*)^{-1}$, in an embodiment iterative adaptive methods such as LMS-like algorithms are usually employed to estimate the channel (or alternatively to directly estimate the crosstalk canceller). This will normally require a significant amount of training data, i.e., L>>N, which inevitably leads to a long training time, before the channel (or canceller) can be estimated with an adequate accuracy.

For DSL vectoring, another challenge related to channel estimation based on regular data is the dynamic scenarios where new line joining event, etc. occurs. Reduced transmit power of the joining lines and/or increased protection margin in SNR for the already vectored lines are partial solutions to reduce the impact of the line joining event on the vectored lines.

A pilot signal (symbol, sequence, . . . ) is a predefined signal (symbol, sequence, . . . ). In an embodiment, such pilot signals are used for facilitating channel estimation.

In the case of multi-user communications, such as DSL vectoring, in an embodiment pilot symbols are synchronized, in order to reduce/avoid inter-user interference, and/or to easily handle the channel estimation. The alignment of the sync symbols for DSL vectoring provides an elegant method to handle the line joining event, etc.

Particularly, when orthogonal, or in general unitary, sequence is used as training signal X, i.e., the row vectors of X are orthogonal to each other, then $XX^*$ reduces to a diagonal matrix $$XX^*=\{XX^*\}_d \quad (34)$$

$(XX^*)^{-1}$ can therefore be computed by simply inversing the diagonal entries. H or $H_{nd}$ can easily be estimated without any matrix inversion. Therefore, orthogonal (unitary) signals are most widely used in pilot-directed channel estimation.

Another type of pilot signal which may be used in an embodiment is the pseudo-random sequence, the so-called m-sequence. Since the pseudo-random sequence is in general not orthogonal, $XX^*$ is not a diagonal matrix. Thus, the channel estimation based on the random sequence is similar to that based on the regular data signal. It may have to involve matrix inversion, or to employ the recursive algorithms, such as LMS-like algorithms, to estimate the channel matrix (or the cancellation matrix).

In ADSL and VDSL systems, the so-called sync symbol is specified for showtime. The sync symbol is a 4-QAM modulated DMT symbol and stays constant for a given sub-carrier. In VDSL, the sync symbol is transmitted periodically once per super-frame which contains 256 regular data frames (symbols) and 1 sync frame (symbol). For 4 kHz sampling rate, a superframe in VDSL will take about 257/4 kHz=64.25 ms. In ADSL, the sync symbol is transmitted periodically once per super-frame which contains 68 regular data frames (symbols) and 1 sync frame (symbol).

As the sync symbol is already specified in DSL system, no extra resource (bandwidth, time slot, etc.) is required when reusing it for the vectoring. In order to effectively handle the channel estimation, especially in the case of dynamic situations (such as line joining), sync symbols of vectoring-enabled lines need to be synchronized. It is worth to note that in this case, the sync symbols used as training signal X are altered from line to line and from time to time. When the sync symbols remain the same or linearly proportional, for example, two lines, then the corresponding two rows in X will be linearly dependent with each other (even if the sync symbol is altered from time to time) which should be avoided. Consequently, $(XX^*)^{-1}$ will not exist. Similarly, for L measurement column vectors $x_0, x_1, \ldots, x_{L-1}$, if many of these vectors are linearly dependent with each other such that X has less than N column vectors which are linearly independent of each other, then $(XX^*)^{-1}$ can not be determined.

In an embodiment for using sync symbol as pilot symbol for channel estimation, e.g. an orthogonal sequence, like the Walsh-Hadamard sequence which consists only of +1 and −1 is used to alternate the sign of the sync symbols. In another embodiment, a special orthogonal sequence containing "unit" signal and "silent" signal is proposed to replace the sync symbol, which enables a direct measurement of each crosstalk channel without any computation. In still another embodiment, the so-called m-sequence instead of the Walsh-Hadamard sequence is utilized to modulate the sign of training signal.

Notice that in all of the above embodiments of crosstalk channel estimation proposals, the sync symbol have to be redefined for the DSL (CO and/or CP) modems with vectoring capability. Since the sync symbol has traditionally been defined for purposes other than the vectoring, such as echo cancellation, FEQ fine adjustment, sync-flag, etc, the redefinition of the sync symbol will impact these relevant DSL modem functionalities. The algorithms for these features (echo cancellation, FEQ, etc.) in legacy modems which do not support the vectoring may not be re-used for vectoring-capable modems. Certain redesign and re-implementation will be necessary.

In an embodiment, therefore the modification of the sync symbol is kept to a minimum. In what follows, we describe embodiments based on using superposed training signal. Instead of modulating/alternating the sync symbol, the sync symbol signal is superposed with a specific test signal in such an embodiment. By carefully choosing the test signal and/or as less as possible sync symbols to be superposed, the modification of the sync symbol can be kept small.

Consider the superposed signal X=S+W for channel estimation, where all X, S and W are complex N×L matrices (N=number of vectoring lines, L=number of measurements). S is called here the reference signal (symbol, sequence), and $W=\{W_{n,l}\}_{N\times L}$ the test signal (symbol, sequence). In an embodiment, the reference signals are standard sync symbols as for example used in DSL. In the embodiment of FIG. 2, X is formed using a pilot signal generator 23, a test signal generator 24 and an adder 25.

Assume that the sync symbol has for the line n (n=0, 1, ..., N−1) a modulation constellation $S_n$. When the column vector $s=[S_0 \; S_1 \; \ldots \; S_{N-1}]^T$ is used as reference signal, then $$x_l = s + w_l = \begin{bmatrix} S_0 \\ S_1 \\ \vdots \\ S_{N-1} \end{bmatrix} + \begin{bmatrix} W_{0,l} \\ W_{1,l} \\ \vdots \\ W_{N-1,l} \end{bmatrix} \quad \forall \, l = 0,1,\ldots,L-1 \quad (35)$$

$$X = \qquad (36)$$

$$S + W = \begin{bmatrix} S_0+W_{0,0} & S_0+W_{0,1} & \ldots & S_0+W_{0,L-1} \\ S_1+W_{1,0} & S_1+W_{1,1} & \ldots & S_1+W_{1,L-1} \\ \vdots & \vdots & \ddots & \vdots \\ S_{N-1}+W_{N-1,0} & S_{N-1}+W_{N-1,1} & \ldots & S_{N-1}+W_{N-1,L-1} \end{bmatrix}$$

It is easy to see that by properly choosing $W=\{W_{n,l}\}_{N\times L}$, $(XX^*)^{-1}$ will exist and H or $H_{nd}$ can therefore be calculated. The method to directly calculate H or $H_{nd}$ based on the superposed signal X according to an embodiment is referred here to as the superposition based channel estimation (without reference). It is interesting to see that one line (e.g. the 0-th line) can remain untouched all the time (i.e. $W_{0,l}=0 \; \forall l=0, 1, \ldots, L-1$), whereas, by properly choosing the test signals for other lines, all rows of X can still be guaranteed to be linearly independent of each other, i.e. $(XX^*)^{-1}$ does exist. Note that in general, the reference signal s can be time-variant for different measurements l. E.g., in the DSL system, the sync symbol changes for the purpose of signaling on-line reconfiguration transitions. In what follows, sometimes $s_l$ is used instead of s to explicitly indicate the temporal dependency of the reference signal.

In an embodiment, the reference signal vector $x_S=s$ is transmitted separately, in addition to the L superposed signals (column vectors) $x_0, x_1, \ldots, x_{L-1}$. Assume the receive signal corresponding to $x_S$ is $y_S$ and the slicer error signal is $e_S$, i.e.

$$y_S = H x_S + z_S \qquad (37)$$

$$e_S = H_d^{-1} y_s - x_S \qquad (38)$$

Subtract the above two equations from Eq. (22) and Eq. (28), respectively, the following is obtained $$y_l - y_S = H(x_l - x_S) + (z_l - z_S) \qquad (39)$$

$$e_l - e_S = H_d^{-1}(y_l - y_S) - (x_l - x_S) \qquad (40)$$

Defining the deference signal $\Delta x_l := x_l - x_s = w_l$, $\Delta y_l := y_l - y_s$, $\Delta z_l := z_l - z_s$ and $\Delta e_l := e_l - e_s$, results in $$\Delta y_l = H w_l + \Delta z_l \qquad (41)$$

$$\Delta e_l = H_d^{-1} \Delta y_l - w_l \qquad (42)$$

or $$\Delta Y = HW + \Delta Z \qquad (43)$$

$$\Delta E = H_d^{-1} \Delta Y - W \qquad (44)$$

Where $\Delta Y := [\Delta y_0, \Delta y_1, \ldots, \Delta y_{L-1}]$, $\Delta Z := [\Delta z_0, \Delta z_1, \ldots, \Delta z_{L-1}]$ and $\Delta E := [\Delta e_0, \Delta e_1, \ldots, \Delta e_{L-1}]$ are N×L matrices which are built by stacking the corresponding L column vectors together, respectively. Notice that the above two equations reduce to Eq. (23) and Eq. (29), when X, Y, Z, E are replaced by W, $\Delta Y$, $\Delta Z$, $\Delta E$, respectively. Consequently, the least square estimate of channel matrix can be calculated as $$\hat{H} = \Delta Y W^+ \qquad (45)$$

$$\hat{H}_{nd} = H_d \Delta E W^+ \qquad (46)$$

When W is chosen such that its N row vectors are linearly independent of each other, then $$W^+ = W^*(WW^*)^{-1} \qquad (47)$$

The method to calculate H or $H_{nd}$ based on the superposed signal X and the reference signal according to an embodiment is referred here to as the superposition based channel estimation with reference. Again, this method works for any known reference signal. The reference signal s can in general be time-variant, namely $s=s_l$, e.g. $s_l = x_{l-\tau}$ ($\tau>0$). Once $s_l$ is chosen, the superposed transmit signal $x_l = s_l + w_l$ can be determined. With a properly chosen test signal $w_l$, e.g., when W is chosen such that it is orthogonal to S, or symbol's constellation in W is orthogonal to that in S, an efficient implementation can become possible.

It should be noted that the additive noise involved in estimating the channel matrix is now $\Delta Z := [\Delta Z_{n,l}]_{N \times L} = [Z_{n,l} - Z_n^S]_{N \times L}$ instead of $Z := [Z_{n,l}]_{N \times L}$, where $Z_n^S$ is the background noise for line n when the reference signal is transmitted. When $Z_{n,l}$ and $Z_n^S$ are independent white noise with the same variance $\sigma_Z^2$, then the variance of $\Delta Z_{n,l}$ will be $$\sigma_{\Delta Z}^2 = 2\sigma_Z^2 \tag{48}$$

Since $\sigma_Z^2$ is very small (e.g., −140 dBm in DSL system), the increase of the noise by a factor of 2 is tolerable. For enough amount of data available (L is large enough), this independent noise $\Delta Z_{n,l}$ can be smoothed out anyway.

Accordingly, the channel estimation error is given as $$H - \hat{H} = \Delta Z W^* \tag{49}$$

$$H_{nd} - \hat{H}_{nd} = \Delta Z W^* \tag{50}$$

Notice that the method without reference can be considered as the method with reference where the reference is equal to zero. Therefore, both methods can be combined or mixed in applications.

By using the superposed signal, it is possible to estimate the channel without redefining the sync symbol. Like the normal pilot signal, the test signal W can be easily chosen such that 1) the row vectors of W are independent of each other, and 2) low implementation complexity is resulted.

In an embodiment, an orthogonal first signal is used. Like normal pilot signal, this is one of the most favorable choices. When any row vectors of the N×L matrix W are orthogonal with each other, the row vectors are referred to as orthogonal sequences. In this case, $WW^*$ is a diagonal matrix and invertible. We first focus on the case where the minimum number of measurements, namely L=N, is used for channel estimation. Furthermore, we assume that W is normalized such that it is the orthonormal matrix, i.e., $WW^* = I$.

One of the orthogonal sequences which may be used in an embodiment is Walsh-Hadamard sequence which consists only of +1 and −1. With the Walsh-Hadamard pilot sequences, only addition/subtraction but no multiplication is required for channel estimation. A 4×4 orthonormal Walsh-Hadamard matrix is given as follows $$W = \frac{1}{2} \begin{bmatrix} +1 & +1 & +1 & +1 \\ +1 & -1 & +1 & -1 \\ +1 & +1 & -1 & -1 \\ +1 & -1 & -1 & +1 \end{bmatrix} \tag{51}$$

Note that although the existence of $2^k \times 2^k$ Walsh-Hadamard matrices (k=integer) are well known, the general N×N Walsh-Hadamard matrices may not necessarily exist.

Another orthogonal sequence which may be used is the basic coordinate sequence which consists only one non-zero element in it. A corresponding 3×3 orthogonal matrix is, e.g., given as $$W = \begin{bmatrix} 1 & 0 & 0 \\ 0 & 0 & 1 \\ 0 & 1 & 0 \end{bmatrix} \tag{52}$$

By appropriate exchange of the row vectors of W, which corresponds to exchange of the indices of the vectored lines, W always be re-written as an identity matrix. Therefore, it is assumed for simplicity W=I (I=identity matrix) in the following.

Orthogonal test signal applied for superposition based channel estimation without reference We multiply at the both sides of $Y = HX + Z$ with $W^*$, then $$YW^* = (HX + Z)W^* = H(S + W)W^* + ZW^* \tag{53}$$

Since W is itself orthogonal, and if W is chosen such that S and W are also orthogonal to each other, i.e., $$SW^* = 0_{N \times N} \tag{54}$$

where $0_{N \times N}$ is an N×N zero matrix. Then, it is obtained $$H = YW^* + ZW^* \tag{55}$$

By omitting the noise term $ZW^*$, the desired channel estimate is obtained according to $$\hat{H} = YW^* \tag{56}$$

The orthogonality condition $SW^* = 0_{N \times N}$ can be relatively easily fulfilled in many cases, e.g. for the reference signal (aligned sync symbols) in DSL S. If the sync symbol remains unchanged during the measurement Y, i.e. each row of S is a constant $\{S\}_{i,j} = S_j \neq 0$ then orthogonality condition $SW^* = 0_{N \times N}$ reduces to $$\sum_{j=0}^{L-1} W_{i,j} = \sum_{j=0}^{L-1} W_{i,j}^* = 0 \tag{57}$$

That means, the sum of the orthogonal sequence (row vector of W) is zero. This condition can be met by many orthogonal sequences. E.g., all Walsh-Hardamard sequences except the first constant sequence [+1 +1 . . . +1] are such orthogonal sequences. In fact, S can be considered to be assigned with this Walsh-Hardamard constant sequence [+1 +1 . . . +1]. Such W can therefore be used for the superposition based channel estimation without reference. Concretely, if orthogonal sequences W which are also orthogonal to the reference signal S are chosen, then the channel can easily be estimated as $\hat{H} = YW^*$. Note that $\hat{H} = YW^*$ is actually the least square solution for which X=W is transmitted (where the reference signal S does not exist).

The channel estimation error is then given as $$H - \hat{H} = ZW \tag{58}$$

For the orthonormal matrix W (with $WW^* = I$), e.g. the basic coordinate sequence, it can be shown that for each channel coefficient, its channel estimate variance is equal to $$E\{|H_{n,m} - \hat{H}_{n,m}|^2\} = \sigma_Z^2 \tag{59}$$

$\sigma_Z^2$ is the background noise (typically, $\sigma_Z^2$ is about −140 dBm in DSL system).

For Walsh-Hadamard matrix with its elements being +1 or −1, it holds $WW^* = LI$ (not normalized) and $$E\{|H_{n,m} - \hat{H}_{n,m}|^2\} = \frac{\sigma_Z^2}{L} \tag{60}$$

We see that not only the estimate $\hat{H} = YW^*$ but also its estimation error are independent of the reference signal.

Orthogonal test signal applied for superposition based channel estimation with reference In this case, the channel estimated is given as $$\hat{H} = \Delta YW \tag{61}$$

$$\hat{H}_{nd} = (H_d \Delta E)W^* \tag{62}$$

Notice that for W=I (I=identity matrix), we have $$\hat{H} = \Delta Y \quad (63)$$

$$\hat{H}_{nd} = H_d \Delta E \quad (64)$$

In other words, the entries of the channel matrix are simply the measured entries of $\Delta Y$ (or $H_d \Delta E$).

In particular, when a single reference measurement $y_S$ with measurement noise $z_S$ is used to build the difference signal, and W is chosen to be self orthogonal and also orthogonal to S (i.e., $SW^* = 0_{N \times N}$), such as the Walsh-Hardamard sequences except the constant sequence, then the constant measurement noise $z_S$ will completely be filtered out by correlating with W, and consequently the system model becomes $$H = \Delta Y W^* + ZW^* \quad (65)$$

Therefore, for the Walsh-Hadamard sequences excluding the constant sequence, its channel estimate error variance becomes the same as the case without reference, namely $$E\{|H_{n,m} - \hat{H}_{n,m}|^2\} = \frac{\sigma_Z^2}{L} \quad (66)$$

When two or more reference measurements $y_S$ are used (such as in the case that the reference signal $s = s_l$ changes for difference measurements), the measurement noises of the reference signal in some lines can usually be filtered out by correlating with W. The variance of the channel estimate error therefore ranges between $\sigma_Z^2/L$ and $2\sigma_Z^2/L$.

In general, W has a dimension of N×L (L≥N). The above discussion is in fact valid not only for L=N but also for L≥N which is the more general case encountered in practice. With large number (L) of measurements, the measurement noise and error can be smoothed out so that the channel can be estimated more accurately. Notice that generation of an arbitrary N×L orthogonal matrix is not straight forward. Here, we consider two following special cases.

1) N×L Orthogonal Matrix Generated by Repetition of the Identity Matrix $I_{N \times N}$ We can e.g. first repeat $I_{N \times N}$ for κ times (κ=integer) such that κN>L to build an N×κN matrix, then W can be built by selecting any successive L column vectors from this N×κN matrix. In this way, we can build an orthogonal matrix of any dimension. E.g., a 3×4 such orthogonal matrix W is given as follows $$\underbrace{\begin{bmatrix} 1 & 0 & 0 & 1 & 0 & 0 \\ 0 & 1 & 0 & 0 & 1 & 0 \\ 0 & 0 & 1 & 0 & 0 & 1 \end{bmatrix}}_{W} \quad (67)$$

2) N×κN Orthogonal Matrix Generated by Repetition of an N×N Orthogonal Matrix

For any given N×N orthogonal matrix, say $W_{N \times N}^0$, an N×κN orthogonal matrix W can be built by simply repeating $W_{N \times N}^0$ for κ times, i.e., $$W = \underbrace{[W_{N \times N}^0, \ldots, W_{N \times N}^0]}_{\kappa \text{ times}} \quad (68)$$

L=κN is one of the most interesting cases in practice. Assume $W_{N \times N}^0$ is orthonormal here, i.e. $(W_{N \times N}^0)(W_{N \times N}^0)^* = I_{N \times N}$, then $WW^* = \kappa I_{N \times N}$ $$W^+ = W^*(WW^*)^{-1} = \frac{1}{\kappa} W^* \quad (69)$$

Let the N×κN noise matrix be $$\Delta Z = \underbrace{[\Delta Z^0, \Delta Z^1, \ldots, \Delta Z^{\kappa-1}]}_{\kappa \, N \times N \text{ matrices}} \quad (70)$$

The channel estimation error is then given as $$H - \hat{H} = H_{nd} - \hat{H}_{nd} = \frac{1}{\kappa} \Delta Z W^* = \frac{1}{\kappa} \left( \sum_{i=0}^{\kappa-1} \Delta Z_{N \times N}^i \right) (W_{N \times N}^0)^* \quad (71)$$

The n,m-th element of $H - \hat{H}$ (n, m=0, 1, ..., N−1) can be written as $$H_{n,m} - \hat{H}_{n,m} = \frac{1}{\kappa} \left( \text{row } n \text{ of} \left\{ \sum_{i=0}^{\kappa-1} \Delta Z_{N \times N}^i \right\} \right) \cdot (\text{column } m \text{ of}\{(W_{N \times N}^0)^*\}) \quad (72)$$

As such, the variance of the estimation error is equal to $$E\{|H_{n,m} - \hat{H}_{n,m}|^2\} = E\{(H_{n,m} - \hat{H}_{n,m})(H_{n,m} - \hat{H}_{n,m})^*\} \quad (73)$$

$$= E\left\{ \frac{1}{\kappa} \left( \text{row } n \text{ of} \left\{ \sum_{i=0}^{\kappa-1} \Delta Z_{N \times N}^i \right\} \right) \cdot \right.$$

$$(\text{column } m \text{ of}\{(W_{N \times N}^0)^*\}) \cdot \frac{1}{\kappa}$$

$$(\text{column } m \text{ of}\{(W_{N \times N}^0)^*\})^* \cdot$$

$$\left. \left( \text{row } n \text{ of} \left\{ \sum_{i=0}^{\kappa-1} \Delta Z_{N \times N}^i \right\} \right)^* \right\}$$

When $W_{N \times N}^0$ is normalized, $$(\text{column } m \text{ of}\{(W_{N \times N}^0)^*\}) \cdot (\text{column } m \text{ of}\{(W_{N \times N}^0)^*\})^* = I_{N \times N} \quad (74)$$

$$E\left\{ \left( \text{row } n \text{ of} \left\{ \sum_{i=0}^{\kappa-1} \Delta Z_{N \times N}^i \right\} \right) \cdot \left( \text{row } n \text{ of} \left\{ \sum_{i=0}^{\kappa-1} \Delta Z_{N \times N}^i \right\} \right)^* \right\} = \kappa \sigma_{\Delta Z}^2 \quad (75)$$

Here each element of $\Delta Z$ is assumed to be a realization of an independent white noise process with the same variance $\sigma_{\Delta Z}^2$. Consequently, we have for the orthonormal sequences, e.g. for basic coordinate sequence, $$E\{|H_{n,m} - \hat{H}_{n,m}|^2\} = \frac{1}{\kappa} \sigma_{\Delta Z}^2 \quad (76)$$

For Walsh-Hadamard sequence having elements +1 or −1 (not normalized), it holds $$E\{|H_{n,m} - \hat{H}_{n,m}|^2\} = \frac{\sigma_{\Delta Z}^2}{\kappa L} \quad (77)$$

We see that the estimation error diminishes with increase of the number of measurements $\kappa L$.

In another embodiment, a pseudo random test signal is used like normal pilot signal, W can be built from any pseudo random sequences, e.g. the m-sequence which consists only of +1 and −1. The only constraint is that any two rows of W need to be independent of each other. To ensure this, one can, e.g., first choose a random sequence of L symbols (when L is larger than the size of the random sequence, one can repeat the random sequence many times such that at least L symbols are contained in the resulting sequence) assigned to the first row of W. The rest rows of W can be chosen as circularly shifted version of the first row, with different shift offsets for different rows. Due to the randomness of the entries in each row, the independency of any two rows in W can be guaranteed.

The randomness of the test signal is, for example, beneficial when adaptive algorithms such as the LMS-like iterative algorithms are employed in channel estimation, or direct interference cancellation.

In an embodiment, the above-described ways of channel estimation are used for crosstalk reduction. Once the channel coefficients are determined, the cancellation matrix can be computed, e.g., using the first order approximation method described before. The superposition based channel estimation methods with and/or without reference can in principle be combined with any interference cancellation algorithms to realize, e.g., the DSL vectoring in different phases (start-up, channel tracking, and line joining/leaving). For different phases, different methods as well as combinations of these methods can be applied. For example, the described superposition based method with reference is used for start-up and line joining/leaving phases, whereas, e.g., a method based on using the regular data symbols for channel estimation is employed for channel tracking phase. Crosstalk reduction is one case of interference cancellation.

Typical procedures for interference cancellation based on the superposed pilot signal may contain following tasks.

A. Superposition Based Method without Reference a) properly choose the test signal vectors $w_0, w_1, \ldots, w_{L-1}$, e.g. using a method described before.

b) transmit the superposed signal vectors $s+w_0, s+w_1, \ldots, s+w_{L-1}$, and collect the corresponding receive signal vectors or slicer error vectors.

c) provide channel estimation based on the signal vectors.

d) provide interference cancellation for data signal based on the estimated channel.

The step c) may not be necessary or can be integrated into step d), e.g. when adaptive algorithm is employed to directly cancel the interference. For time varying channel, the above tasks should be repeated periodically such that within one period the variation of the channel does not have intolerable impact on services.

When test signal W can be chosen to be self orthogonal and orthogonal to the reference S at the same time, such as the Walsh-Hadamard sequences (excluding the first constant sequence) superposed to the constant sync symbols, then very simple channel estimation without matrix inversion can be realized.

B. Superposition Based Method with Reference

Superposition based method with reference may be provided based on the following steps:

a) properly choose the test signal vectors $w_0, w_1, \ldots, w_{L-1}$, e.g., using a method described before.

b) transmit the superposed signal vectors $s+w_0, s+w_1, \ldots, s+w_{L-1}$, and collect the corresponding receive signal vectors or slicer error vectors.

c) transmit the reference signal vector s, and collect the corresponding receive signal vector or slicer error vector.

d) build the difference signal vectors between the superposed signal vectors and the reference signal vectors, for transmit signal, receive signal or slicer error signal e) channel estimation based on the difference signal vectors.

f) interference cancellation for data signal based on the estimated channel.

Notice that the reference signal s needs to be known or to be somehow determinable at the receiver, and thus it may be transmitted explicitly or implicitly, especially when it temporally changes. Correspondingly, the step c) can be modified/realized in various ways. In the current DSL systems, the reference signal (sync symbols) is explicitly transmitted, i.e. step c) already exists. Steps d), e), f) are receiver-specific and can be implemented also in different ways, e.g., step e) may not necessarily exist or may be integrated into f).

C. A Procedure for DSL Vectoring with Sync Flag Handling

Sync symbol has a 4-QAM constellation. Let assume that, e.g., $S_n = (+1, +1)\sigma_{S_n}$ and $S_n = -(+1, +1)\sigma_{S_n}$ be the normal sync symbol used for the sync flag of the n-th line, with $2\sigma_{S_k}^2$ being the power of the sync symbol. In the case of sync flag signaling, $S_n$ will become $-S_n$ (or $-S_n$ becomes $S_n$). We can thus denote the normal sync symbol as $V_{n,i}S_n$, where $V_{n,i} \in \{+1,-1\}$ represents the sync flag signaling. In this case, we can use the unused constellations, e.g., $W_{n,i}S^*_n = W_{n,i}(+1,-1)\sigma_{S_k}$, as test signal (e.g., $W_{n,i} \in \{+1,-1\}$ is the Walsh-Hadamard sequence). The superposed signal can be written as $X_{n,i} = \alpha_n V_{n,i} S_n + \beta_n W_{n,i} S^*_n$, where $\alpha_n$ and $\beta_n$ are constants for power normalization. E.g., if we choose $\alpha_n, \beta_n \geq 0$ and $\alpha_n^2 + \beta_n^2 = 1$, then the superposed signal will have the same power $2\sigma_{S_n}^2$ as the normal sync signal. It is worth to point out that for such a choice, the reference signal with a symbol constellation $V_{n,i}S_n$ and the test signal with a symbol constellation $\beta_n W_{n,i} S^*_n$ are orthogonal to each other. They do not interfere with each other and can be detected independently. The reference signal has no impact when detecting the test signal (irrespective whether the reference signal has more or less power), and vice versa.

Specifically, when employing the superposition based channel estimation with reference, we can choose $S_n$ as reference signal which can serve as sync flag at the same time, and $\beta_n W_{n,i} S^*_n$ as test signal. Note that for $\alpha_n, \beta_n \neq 0$ the superposed transmit signal $X_{n,i}$ contains both the information on sync flag and the information on the test signal for channel measurement. When choosing $\alpha_n = 0$ and $\beta_n = 1$, then the test signal has the whole power of the superposed signal and the channel estimation based on test signal and the sync flag signaling using sync symbol are carried out separately. The test signal and the reference signal (i.e., sync flag) are transmitted in a manner of a time division multiplexing.

An example procedure with sync flag handling

Properly choose the test signal column vectors $w_0, w_1, \ldots, w_{L-1}$, e.g., as Walsh-Hadamard sequence (excluding the constant sequence)

initialization counter of all sync symbols j=0, counter of the superposed sync symbols l=0 transmit the reference signal vector s (and collect the receive signal). This step is optional. When not conducted, it is equivalent to having s=0 and y=0.

transmit the superposed signal vectors $s+w_l$, $l \leftarrow l+1$, $j \leftarrow j+1$, where e.g. the vector s contains the elements $\alpha_n V_{n,i} S_n$ ($\alpha_n \geq 0$) and $w_l$ the elements $\beta_n W_{n,i} S^*_n$.

when l=L, go to f)

when the sync symbol signaling in any lines is requested for the time j, then transmit the sync symbol signaling vector $s \leftarrow s_j$ as reference signal, where the vector $s_j$ is the existing sync symbol vector and its elements are e.g. $V_{n,i} S_n$.

j←j+1 go to b)

build the difference receive signal vectors.

channel estimation based on the difference signal vectors.

interference cancellation for data signal based on the estimated channel.

go to b). (This step enables a permanent procedure loop)

In this procedure, we have used the superposed sync symbols for channel measurement and the normal sync symbols (as currently defined in DSL standards) as sync flag and reference. Step d) and e) enforce at least one superposed signal is transmitted after each reference signal (i.e., no immediate successive sync flag signaling). This ensures that at least after 2L sync symbols the channel can be fully estimated. During this period of time, at most L sync flag signalings are possible. Depending on the relative priorities of channel measurement and sync flag, this procedure can be easily modified to allow quicker channel measurement (e.g., by letting the sync flag signaling wait until the channel measurement is done), or quicker sync flag signaling by giving the sync flag signaling higher priority than the channel measurement.

A simple example with basic coordinate sequence

For estimating the full channel matrix, at least N superposed signals and possibly one reference signal, i.e., N+1 signals, need to be transmitted. To reduce impact of the channel variation with time, we can first transmit half of the N superposed signals, then the reference signal, and then the rest of the superposed signals. This process can be repeated for κ times (e.g., κ=10) in order to smooth out the estimation errors to obtain adequate accuracy.

For the DS direction, the channel estimation can be done at CP, or at CO, or partly at CP and partly at CO. When it is done fully at CP, only the estimated channel coefficients with adequate accuracy need to be transmitted back to CO, which costs less bandwidth for feedback channel. When it is done fully at CO, CP needs simply to transmit, e.g., the slicer errors, back to CO, which may need more bandwidth for feedback channel.

To build the N superposed signals, the most simple test signals are $W=I_{N \times N}$, since in this case, the channel can, as shown before, be directly measured. FIG. 2 shows such an example. Keep in mind that the sync symbols of all lines are aligned in time domain. With $W=I_{N \times N}$ each time there is only one line's sync symbol is superposed by a unit signal. The other lines' sync symbols remain unchanged. For the reference signal, there is no change on the sync symbol at all. In this way, the modification on the sync symbols is kept small. Moreover, one can use a constant signal with reduced power as test signal, e.g., $W=\alpha I_{N \times N}$ with $|\alpha|$ being small enough, then superposing a test signal on the sync symbol will have a very small even negligible impact on the existing functionalities relying on the sync symbol (echo cancellation, FEQ, etc. in current DSL system). The existing implementation of these functionalities can thus be reused without modification.

In contrast to one of the methods mentioned above, we may not use any "quiet signal" to replace the existing sync symbol. The "unit signal" used in such a method is substituted in the present embodiment with the sync symbol superposed by test signal. The test signal can, e.g., be chosen as "unit signal", as shown in the above simple example.

DSL Vectoring Procedure

For example, when pseudo random sequence is used as test sequence, the superposition based interference cancellation without reference can be employed in the way that data symbols are used for channel estimation. When pilot sequence, especially orthogonal sequence, is used as test sequence, the superposition based interference cancellation with reference can be used in a similar way as described above. Below are a few example applications for DSL vectoring.

A. Initial Start-Up

In the following, the channel estimation method with reference is taken as example. For the sync symbols where the "quiet signal" is transmitted in, the reference symbols (=sync symbols) are transmitted, i.e., there is no modification on sync symbols. For the sync symbol where the "unit signal" is transmitted, the superposed symbols can be transmitted, where the test signal can, e.g., be chosen to be a "unit signal". Similar methods can be applied for other phases such as channel tracking and line joining/leaving outlined below.

B. Channel Tracking

For tracking the channels during showtime, superposition based channel estimation can be employed in conjunction with conventional procedures.

C. Line Joining/Leaving

Similar procedures conventionally used can be developed using the superposition based channel estimation methods. Again, due to the use of the aligned sync symbols, there is no performance degradation in transmission of data symbols.

When orthogonal test sequences W are chosen to be orthogonal to the reference signal as well, such as the Walsh-Hadamard sequences (excluding the first constant sequence) which are orthogonal to the constant sync symbols of the DSL systems, the channel can be estimated independently of the reference signal as $\hat{H}=YW^*$.

Next, embodiments adapted to a situation where legacy modems exist in a communication system will be described.

A legacy modem here stands for a modem with no vectoring capability or with the vectoring capability disabled. In general, when CO has only legacy modems, no vectoring is possible. The scenario considered here is that at CO all modems are vectoring-capable and -enabled, but for CP's connected to the CO some are vectoring-enabled and some not. Without loss of generality, assume the first group of $N_1$ lines are connected to vectoring-enabled CP modems, and the second group of $N_2$ lines ($N_1+N_2=N$) are connected to legacy CP modems. The general MIMO system model given in Eq. (23) or Eq. (43) which is valid for both DS and US can be re-written as $$\begin{bmatrix} Y_1 \\ Y_2 \end{bmatrix} = \begin{bmatrix} H_{11} & H_{12} \\ H_{21} & H_{22} \end{bmatrix} \begin{bmatrix} X_1 \\ X_2 \end{bmatrix} + \begin{bmatrix} Z_1 \\ Z_2 \end{bmatrix} \qquad (78)$$

where $X = \begin{bmatrix} X_1 \\ X_2 \end{bmatrix}, Y = \begin{bmatrix} Y_1 \\ Y_2 \end{bmatrix}, Z = \begin{bmatrix} Z_1 \\ Z_2 \end{bmatrix}, H = \begin{bmatrix} H_{11} & H_{11} \\ H_{21} & H_{22} \end{bmatrix}$ represent transmit signal, receive signal, noise and channel matrix, respectively. $X_1, Y_1$ and $Z_1$ are $N_1 \times L$ matrices denoting the signals for the first group of $N_1$ lines. $X_2, Y_2$ and $Z_2$ are $N_2 \times L$ matrices denoting the signals for the second group of $N_2$ lines. $H_{11}$ is the $N_1 \times N_1$ channel matrix for the first line group, $H_{22}$ the $N_2 \times N_2$ channel matrix for the second line group, $H_{12}$ the $N_1 \times N_2$ matrix denoting the coupling coefficients from the second line group into the first line group, and $H_{21}$ the $N_2 \times N$ matrix denoting the coupling coefficients from the first line group into the second line group, respectively.

Notice that $H_{11}$, $H_{12}$, $H_{21}$ and $H_{22}$ can usually be determined when some data $X_1$, $Y_1$, $X_2$ or $Y_2$ are known. If there is no receive signal, say $Y_2$, available for the (legacy) modems, the channel coefficients $H_{21}$ cannot be determined, and therefore it is impossible to cancel the crosstalk in the second line group, $H_{21}X_1$, which originates from the first line group. The question now is, when $X_1$, $Y_1$ and $X_2$ are known and $Y_2$ is not known, which is our case at CO with $X_1$, $Y_1$ corresponding to the vectoring-enabled lines and $X_2$, $Y_2$ to the legacy lines, is it possible to cancel both the self crosstalk $H_{11}X_1$ and the alien crosstalk $H_{12}X_2$ (from the second line group)? The answer is yes, as soon as $H_{11}$ and $H_{12}$ can be determined in advance. E.g., with the ZF algorithm employed and according to Eq. (78), $X_1$ can be estimated as $$\hat{X}_1 = H_{11}^{-1}(Y_1 - H_{12}X_2) \quad (79)$$

which is crosstalk-free.

To determine $H_{11}$ and $H_{12}$, we rewrite Eq. (78) as follows $$Y_1 = [H_{11} H_{12}]X + Z_1 \quad (80)$$

For the known training signals $X_1$, $Y_1$ and $X_2$, the least square estimate of the desired channel is immediately given as $$[\hat{H}_{11} \hat{H}_{12}] = Y_1 X^+ \quad (81)$$

Similarly, when instead of $Y_1$, the slicer error $$E_1 = \{H_{11}\}_d^{-1} Y_1 - X_1 \quad (82)$$

is available, then $$[\hat{H}_{11} \hat{H}_{12}] = \{H_{11}\}_d (X_1 + E_1) X^+ \quad (83)$$

Where the diagonal elements of $H_{11}$ are assumed to be available and need not to be estimated here, for example, when they have been determined during conventional link establishment.

When the superposition-based channel estimation without reference is used, say with the orthogonal Walsh-Hadamard sequences (excluding the first constant one) as pilot signals for both vectoring-enabled modems and legacy modems, we have $$[\hat{H}_{11} \hat{H}_{12}] = Y_1 W^+ \quad (84)$$

$$[\hat{H}_{11} \hat{H}_{12}] = \{H_{11}\}_d (W_1 + E_1) W^+ \quad (85)$$

When the superposition-based channel estimation with reference is used, we have $$[\hat{H}_{11} \hat{H}_{12}] = \Delta Y_1 W^+ \quad (86)$$

$$[\hat{H}_{11} \hat{H}_{12}] = \{H_{11}\}_d (W_1 + \Delta E_1) W^+ \quad (87)$$

with $$W = \begin{bmatrix} W_1 \\ W_2 \end{bmatrix}.$$

$W_1$ and $W_2$ are the test signals superposed for the first and the second line group, respectively. $\Delta Y_1$ and $\Delta E_1$ are the difference signals corresponding to $Y_1$ and $E_1$, respectively. Note that with a superposition based method, we do not need to distinguish between the vectoring-enabled and the legacy modems.

Example 1

Vectoring for 32 Users

For a system with 32 users, the whole pilot sequence (32 symbols long) can be transmitted in about 1 second with 8 kHz DMT-frame rate (30-profile). With a 128 kbps feedback channel, 2000 carriers to be estimated, and 8-10 bits resolution of the slicer error signal, the first channel estimate within about 1 second is sufficient for suppressing the crosstalk down to the level of the background noise.

Under the assumption that only sync symbols are used for different phases, the same performance figures then hold for different phases (start-up, tracking and joining), i.e., about 1 second is required for 32 lines to start-up, and for one or more new lines to join the existing lines group.

Choice of Test Signals

In an embodiment, we superpose test signals of different strengths for vectoring-enabled modems and legacy modems. Since the accuracy and the training time required in channel estimation is inversely proportional to the power assigned to the training signal, it is always beneficial to assign more power to the test signal for a higher estimation accuracy and/or shorter estimation time.

Specifically, when orthogonal reference signal and test signal, such as $\alpha_n V_{n,i} S_n$ or $V_{n,i} S_n$ (sync symbol) as reference signal and $\beta_n W_{n,i} S^*_n$ as test signal, the accuracy of the crosstalk channel measurement will only depend on $\beta_n$, and the performance of the sync flag signaling only on $\alpha_n$. A good compromise can usually be achieved by properly choosing $\alpha_n, \beta_n \geq 0$ and $\alpha_n^2 + \beta_n^2 = 1$. Notice that $\alpha_n V_{n,i} S_n$ and $\beta_n W_{n,i} S^*_n$ are orthogonal and do not interfere with each other, but due to the power constraint $\alpha_n^2 + \beta_n^2 = 1$, the power individually assigned to the reference signal and the test signal is reduced. This will eventually lead to some performance loss in channel measurement and sync flag signaling.

For vectoring-enabled DSL modems, we can choose relatively large superposing signal (i.e. $\beta_n \geq \alpha_n$). This will lead to no performance loss since the new modems know exactly how the sync symbols are modified by superposition, and hence the test signal will not be treated as interference. Even if we lower the power of the test signal by a factor 2 (i.e., 3 dB, by using $\beta_n = \alpha_n$), channel estimation for start-up or joining event can still be done within about 2 seconds to reach a high accuracy.

For legacy DSL modems, the superposing test signal in an embodiment is small enough to guarantee the full functionality of the sync symbols since the superposing signal will act as interference (e.g., choosing $\beta_n^2/\alpha_n^2 = 1/10$, then the test signal is 10 dB lower than the sync symbol). In DSL system, the sync symbols with 4-QAM (2-bit) constellation have been designed to be able to cope with very strong interference such as impulse noise and strong crosstalk, so that the whole system can work robustly under bad channel conditions. For this reason, a superposing signal whose power is, e.g., more than 6 dB, or more than 10 dB below the sync symbols, can be added to the sync symbols, without distorting their functionality.

Example 2

Vectoring for 32 Users Using Superposition Based Method

Same as in the case of Example 1, assume that the test signal added to the sync symbols has a power which is 10 dB (a factor of 10) below the normal sync symbol (although a different factor may be used), and the Walsh-Hadamard sequences are used as training sequence. By using the superposition based method without reference, 10 times of data, or equivalently 10 times of estimation time, namely about 10 seconds, are used in an embodiment. Similarly, by using the superposition based method with reference, about 20 seconds are required for the same estimation accuracy since using difference signal between the superposed signal and the reference signal can double the background noise. This is also the time required for a joining event in which one or more vectoring-enabled or legacy modems join the existing vectoring group. The total number of users after joining is assumed here to be 32. A joining procedure for a legacy modem is illustrated in Example 3 below.

Next, methods for co-existence of vectoring-enabled and legacy modems according to embodiments will be described.

Notice that once $X^+$ exists, i.e., $X^+=X^*(XX^*)^{-1}$, or once $W^+=W^*(WW^*)^{-1}$ exists, $H_{11}$ and $H_{12}$ can be estimated, and consequently, the crosstalk in the first line group can be cancelled. As pointed out before, $X^+$ exists uniquely if and only if all rows of X are linearly independent of each other. For the first line group with vectoring-enabled, the $N_1$ rows of $X_1$ must be linearly independent of each other already, and they can be chosen such that they are independent of the $N_2$ rows of $X_2$ at the same time. Thus, the issue now is to ensure that the $N_2$ rows of $X_2$ are linearly independent of each other. Following possible solutions exist to realize this goal.

A. Sync symbols of the first line group are aligned, and sync symbols of the second line group are not aligned with the sync symbols of the first line group.

Assume that the known training signals $X_1$, $Y_1$ (or $E_1$) and $X_2$ for the channel estimate are only available/collected for the time period of the sync symbols of the first line group. The method A indicates that $X_2$ is the regular data signal. Due to the randomness of the regular data, all rows of $X_2$ will become independent of each other, and also independent of rows of $X_1$, at least for relatively large L. This guarantees the existence of $X^+$. Here the superposition based methods can, for example, be utilized to determine $H_{11}$.

B. Sync symbols of the first line group and the second line group are aligned.

In the case that sync symbols of the first line group and the second line group are aligned two different cases may be distinguished as outlined below.

The second group consists of only one legacy CP modem ($N_2=1$)

In this case, $X_2$ is a vector containing the constant sync symbols. As indicated before, by appropriately choosing $X_1$, e.g., using a superposition based method, $X_2$ will be linearly independent of $X_1$, thus the existence of $X^+$ can be ensured. No modification of the sync symbol of the legacy modem is necessary.

The second group consists of more than one legacy CP modems ($N_2>1$).

In this case, $X_2$ is a matrix with all its entries having the same value of the sync symbol. The $N_2$ rows of $X_2$ have to be modified in order to become linearly independent of each other. We can use the described superposition based method to achieve this requirement. E.g., we can superpose appropriate orthogonal test signals to the sync symbols of the first line group and also to the sync symbols of at least $N_2-1$ lines of the second group. By properly choosing the test signals (reduced magnitude, less sync symbols to superpose), the legacy modem will be able to correctly handle the slightly modified sync symbols.

Example 3

Procedure for "Joining Event" of a Legacy Modem with the Method B

1) For a given tone, only the sync symbols of the legacy modem are allowed to transmit with normal power. No power (or a drastically reduced power which has a tolerable impact on the vectored lines) is allocated to other symbols of the legacy modems (e.g., by loading of zero bits on that tone).

2) For a given tone, superpose test signals (with reduced power), such as the test signal from Walsh-Hadamard matrix or the identity matrix, on the sync symbols of the legacy modem, and use a superposition based method for channel estimation.

The above procedure is repeated until all coupling coefficients of the crosstalk originating from the legacy modems are estimated by the vectored modems. After the mechanism for cancelling the crosstalk from the legacy modems is enabled, data symbols of the legacy modem can be transmitted normally with full power. As such there is no impact on the vectored lines, because of the alignment of all sync symbols.

Similarly, step 2) described above can be used for tracking of crosstalk channel variation from legacy modem. Step 1) is not required in this case.

Figure 3:
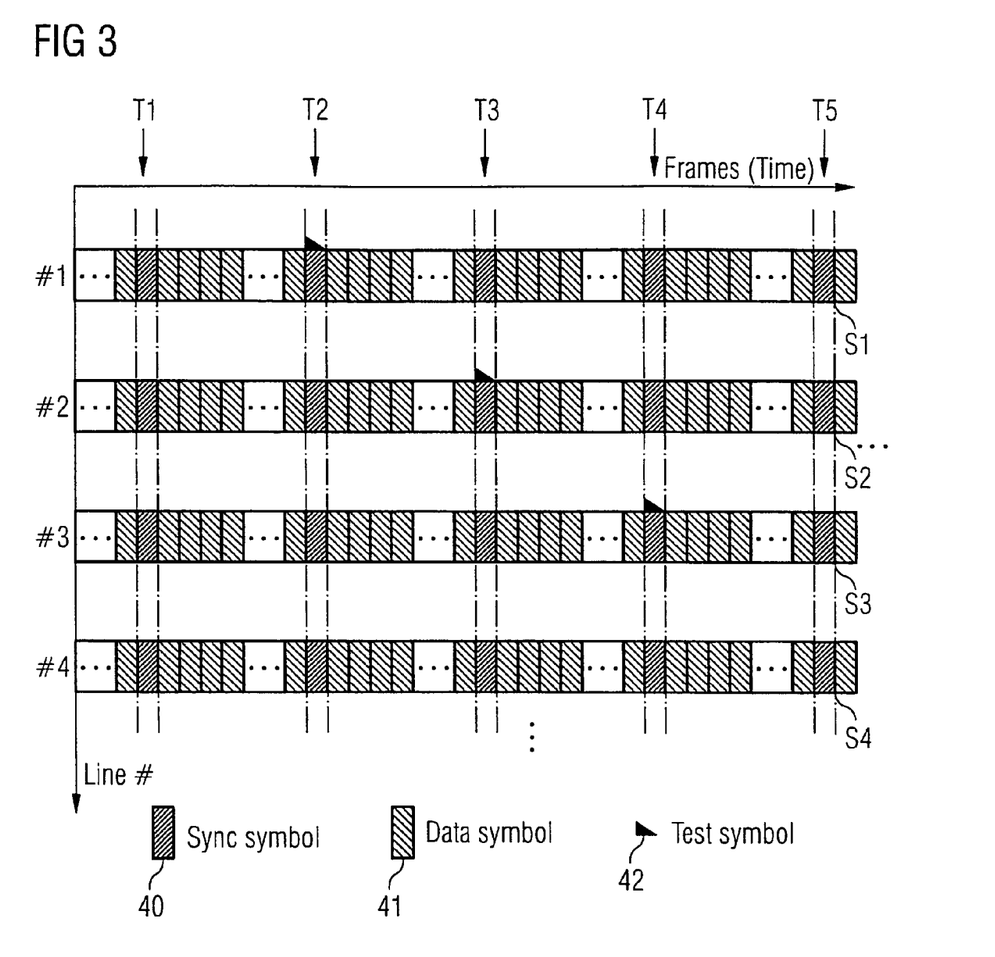
FIG. 3 shows a frame structure according to an embodiment of the present invention.

In FIG. 3, an example for an embodiment for channel estimation using the above-described method where test symbols are superposed on sync symbols is shown. In an exemplary manner, in FIG. 3 the frames transmitted via four DSL-lines numbered #1 to #4 is shown. The sync symbols 40 of the individual lines which are shown as dark rectangles are synchronized at times T1, T2, T3, T4, T5, for example, sync symbols S1, S2, S3, S4 at T5. Test symbols 42 are superposed on some of the sync symbols as represented by triangles 42. Later symbols are transmitted between the sync symbols as represented by light rectangles 41.

The above embodiments are not to be construed as limiting the scope of the present invention, but serve only for illustrating the principles of the invention to a person skilled in the art and which may be modified in numerous ways. Moreover, the application of embodiments for channel estimation is not restricted to the determining of a channel matrix for use in crosstalk reduction, but such a matrix and the coupling coefficients it contained may also be used for other purposes.

The scope of the invention is intended to be limited only by the appended claims and equivalents thereof.

What is claimed is:

1. A method for determining coupling coefficients between a plurality of communication links, the method comprising:
   providing a respective pilot signal for the plurality of communication links, wherein the respective pilot signal comprises a pilot symbol sequence and is used for at least one of channel estimation or synchronization;
   adding a respective test signal to the respective pilot signal of the plurality of communication links to form respective combined signals, wherein each of the respective test signals comprises test symbol sequence, and the pilot symbol sequence is orthogonal to the test symbol sequence;
   receiving, from a far-end device of the plurality of communication links, information regarding signals received at the far-end device; and
   generating modified information signals by multiplying a pre-compensating matrix to information signals of a plurality of users, wherein the pre-compensating matrix is determined based on the received information regarding the signals received at the far-end device; and transmitting the respective combined signal, wherein
a first group of the plurality of communication links is connected to a vectoring-enabled Digital Subscriber Line (DSL) modem, wherein a legacy DSL modem is more prone to suffer low performance due to the test signals than the vectoring-enabled DSL modem,
a second group of the communication links is connected to the legacy DSL modem, and
the respective test signals added to the respective pilot signal of each of the plurality of communication links of the second group are smaller than the respective pilot signal of the communication links of the second group by at least 3 dB.

2. The method of claim 1, wherein the respective pilot signal is transmitted on at least one second link of the plurality of communication links.

3. The method of claim 1, wherein a constellation of the respective test signal is chosen to be orthogonal to a constellation of the pilot signal.

4. The method of claim 1, further comprising:
calculating at least one coupling coefficient between the at least two communication links based on the information and the test signals.

5. The method of claim 1,
wherein the steps of providing, adding and transmitting are conducted a plurality of times; and
wherein a number of transmissions is equal to or greater than a number of the plurality of communication links.

6. The method of claim 5, wherein vectors, each of the vectors being constituted by the signals transmitted in a plurality of transmissions via one of the plurality of communication links, are linearly independent of each other.

7. The method of claim 6, wherein the vectors are orthogonal to each other.

8. A communication apparatus, comprising:
a transmitter to be coupled with a plurality of communication links;
a pilot signal generator to generate a respective pilot signal for each of the plurality of communication links, wherein the respective pilot signal comprises a pilot symbol sequence and is used for at least one of channel estimation or synchronization;
a test signal generator to generate respective test signals for the plurality of communication links, wherein each of the respective test signals comprises test symbol sequence, and the pilot symbol sequence is orthogonal to the test symbol sequence;
an adder to add the respective test signals to the respective pilot signals to form respective combined signals;
a receiver to receive, from a far-end device of the plurality of communication links, information regarding signals received at the far-end device; and
a pre-compensator to generate modified information signals by multiplying a pre-compensating matrix to information signals of a plurality of users, wherein the pre-compensation matrix is determined based on the received information regarding the signals received at the far-end device, wherein
the transmitter is configured to transmit the respective combined signals,
a first group of the plurality of communication links is connected with a vectoring-enabled Digital Subscriber Line (DSL) modem, wherein a legacy DSL modem is more prone to suffer low performance due to the test signals than the vectoring-enabled DSL modem,
a second group of the plurality of communication links is connected with the legacy DSL modem, and
the respective test signals added to the respective pilot signal of each of the plurality of communication links of the second group are smaller than the respective pilot signal of the plurality of communication links of the second group by at least 3 dB.

9. The apparatus of claim 8, further comprising:
a calculator to calculate at least one coupling coefficient between the plurality of communication links based on the information and the test signals.

10. The apparatus of claim 9, further comprising:
a crosstalk reduction circuit to reduce crosstalk based on the at least one coupling coefficient.

11. The apparatus of claim 8,
wherein the apparatus is configured to perform the generation of signals, adding and transmitting repeatedly a plurality of times; and
wherein a number of repetitions is equal to or greater than a number of the plurality of communication links.

12. The apparatus of claim 11, wherein vectors, each of the vectors being constituted by the signals transmitted in a plurality of transmissions via one of the plurality of communication links, are linearly independent.

13. The apparatus of claim 12, wherein the vectors are orthogonal.

14. The apparatus of claim 8, wherein the plurality of communication links comprise digital subscriber line (DSL) communication lines.

15. A communication apparatus, comprising:
a transmitter;
an addition circuit to add test symbols comprising a test symbol sequence to pilot symbols comprising a pilot symbol sequence to be transmitted via a plurality of communication lines coupled with the transmitter, the pilot symbols being used for at least one of channel estimation or synchronization, wherein the pilot symbol sequence is orthogonal to the test symbol sequence; and
a receiver to receive, from a far-end device of the communication lines, information regarding signals received at the far-end device; and
a pre-compensator to generate modified information signals by multiplying a pre-compensating matrix to information signals of a plurality of users, wherein the pre-compensation matrix is determined based on the received information regarding the signals received at the far-end device, wherein
a first group of the plurality of communication lines is connected to a vectoring-enabled Digital Subscriber Line (DSL) modem, wherein a legacy DSL modem is more prone to suffer low performance due to the test symbols than the vectoring-enabled DSL modem,
a second group of the plurality of communication lines is connected to the legacy DSL modem,
the test symbols added to pilot symbols of communication lines of the second group are smaller than respective pilot symbols of the communication lines of the second group by at least 3 dB.

16. The apparatus of claim 15,
wherein the transmitter is configured to transmit test symbols added to pilot symbols repeatedly; and
wherein the apparatus is configured to add test symbols to each pilot symbol transmitted to determine coupling coefficients between the communication lines.

17. The apparatus of claim 15, wherein the apparatus is configured to transmit a pilot symbol at least once over each communication line without a test signal added.

18. The apparatus of claim 15, further comprising:
a calculation circuit configured to calculate coupling coefficients between the plurality of communication lines based on the test symbols.

19. A communication system, comprising:
a first communication apparatus; and
a plurality of second communication apparatuses, wherein each of the second communication apparatuses is coupled with the first communication apparatus, wherein
the first communication apparatus comprises a transmitter configured to synchronously transmit test signals added to synchronization signals and pilot signals to each of the second communication apparatuses, wherein
the test signals comprise a test symbol sequence,
the pilot signals comprises a pilot signal sequence,
the pilot signal sequence is orthogonal to the test symbol sequence,
the first communication apparatus further comprises a receiver to receive, from the plurality of second communications apparatuses, information regarding signals received at the plurality of second communications apparatuses,
the first communication apparatus further comprises a pre-compensator to generate modified information signals by multiplying a pre-compensating matrix to information signals of a plurality of users, wherein the pre-compensation matrix is determined based on the received information regarding the signals received at the plurality of second communications apparatuses,
a first group of the plurality of second communication apparatuses comprises a vectoring-enabled Digital Subscriber Line (DSL) modem, wherein a legacy DSL modem is more prone to suffer low performance due to the test signals than the vectoring-enabled DSL modem,
a second group of the plurality of second communication apparatuses comprises the legacy DSL modem, and
the test signals added to pilot signals coupled to the second group are smaller than its respective pilot signals by at least 3 dB.

20. The system of claim 19, wherein at least a part of the second communication apparatuses comprises a transceiver configured to transmit information regarding receipt of the test signals to the first communication apparatus.

21. The system of claim 20, wherein the information comprises information taken from the group consisting of received signals and a slicer error.

22. The method of claim 1, wherein the respective test signal is used for determining crosstalk coupling.

23. The method of claim 22, wherein the crosstalk coupling comprises far end crosstalk coupling.

24. The method of claim 1, wherein the plurality of communication links comprises a DSL communication link or a wireless communications link.

25. The apparatus of claim 8, wherein the respective test signals are used for determining crosstalk coupling.

26. The apparatus of claim 25, wherein the crosstalk coupling comprises far end crosstalk coupling.

27. The apparatus of claim 8, wherein the communication apparatus is configured to transmit on a DSL communication link or a wireless communication link.

28. A broadband communication system comprising the apparatus of claim 8.

29. The apparatus of claim 16, wherein the coupling coefficients represent crosstalk coupling.

30. The apparatus of claim 29, wherein the crosstalk coupling comprises far end crosstalk coupling.

31. The apparatus of claim 8, wherein the communication apparatus is configured to transmit on a digital subscriber line (DSL) communication link or a wireless communication link.

* * * * *